(12) United States Patent
Ida et al.

(10) Patent No.: US 7,907,947 B2
(45) Date of Patent: Mar. 15, 2011

(54) CELL SEARCH CONTROL METHOD AND MOBILE DEVICE USING THE METHOD

(75) Inventors: Takehiro Ida, Yokosuka (JP); Masato Maeda, Yokohama (JP); Yukihiko Okumura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 835 days.

(21) Appl. No.: 11/664,087

(22) PCT Filed: May 22, 2006

(86) PCT No.: PCT/JP2006/010169
§ 371 (c)(1),
(2), (4) Date: Mar. 29, 2007

(87) PCT Pub. No.: WO2006/123821
PCT Pub. Date: Nov. 23, 2006

(65) Prior Publication Data
US 2008/0057959 A1    Mar. 6, 2008

(30) Foreign Application Priority Data

May 20, 2005 (JP) ................. 2005-148512
Oct. 5, 2005 (JP) ................. 2005-292551

(51) Int. Cl.
*H04Q 7/20* (2006.01)

(52) U.S. Cl. ............. 455/435.1; 455/434; 455/436; 455/437; 455/422.1; 455/515; 370/332; 370/252

(58) Field of Classification Search ............... 455/435.1, 455/436, 422.1, 434, 437, 515; 370/332, 370/252
See application file for complete search history.

(56) References Cited

U.S. PATENT DOCUMENTS

| 7,292,551 | B2 * | 11/2007 | Lim et al. ............ 370/332 |
| 7,809,411 | B2 * | 10/2010 | Arimitsu ............. 455/574 |
| 2004/0106407 | A1 * | 6/2004 | Kikuma et al. ...... 455/436 |
| 2005/0014504 | A1 * | 1/2005 | Iimori ................. 455/437 |

FOREIGN PATENT DOCUMENTS

| JP | 2003-134549 | 5/2003 |
| JP | 2003-259416 | 9/2003 |
| JP | 2004-72179 | 3/2004 |
| JP | 2004-165979 | 6/2004 |
| JP | 2005-039367 | 2/2005 |
| JP | 2005-510988 | 4/2005 |

* cited by examiner

*Primary Examiner* — Charles N Appiah
*Assistant Examiner* — Michael T Vu
(74) *Attorney, Agent, or Firm* — Finnegan, Henderson, Farabow, Garrett & Dunner, LLP

(57) ABSTRACT

A cell search control that can save power consumption at a mobile device and perform an appropriate in-service area determination is provided. The mobile device according to the present invention includes: a cell search execution unit (120) for detecting a synchronization channel from a base station to perform cell search; a signal reception determination unit (130) for comparing a measurement X of the signal from the base station with a system information reception threshold A and determining whether or not to receive a system information from the base station; and an in-service area determination unit (170) for comparing the measurement X with a minimum required quality level B contained in the system information and determining whether or not to enter into an in-service area state with the base station. Depending on the result of the in-service area determination unit, the reception threshold A or a waiting time for the cell search may be adjusted, or the base station may be excluded from the cell search. Thus, the power consumption at the mobile device can be saved, and an appropriate in-service area determination can be made even when the minimum required quality level B has been changed.

18 Claims, 10 Drawing Sheets

CELL SEARCH CONTROL METHOD AND MOBILE DEVICE USING THE METHOD

TECHNICAL FIELD

The present invention relates to cell search control for mobile communication systems, and more particularly to cell search control that can reduce power consumption at mobile devices.

BACKGROUND ART

In mobile communication systems represented as cellular systems, a mobile device is required to determine which base station (cell) to connect to. This processing is typically performed on the mobile device side and is referred to as cell search. Generally, in the cell search, the mobile device detects a synchronization channel (such as a pilot signal) of a base station located within the receiving range, and attempts to synchronize with the base station for the detected signal. Once the synchronization is established, the mobile device transmits and receives control signals such as a system information to and from the base station and enters into the in-service area state in which the mobile device can communicate with the mobile communication system.

In practice, the mobile communication system may have a control over whether or not the mobile device should enter into the in-service area state, depending on the reception level or reception quality at the mobile device. Specifically, the mobile communication system dictates a threshold for entering into the in-service area state (a minimum required quality level) to the mobile device through the system information. Then, the mobile device enters into the in-service area state if a measurement detected in the cell search, such as the reception level or reception quality, is above the threshold. Otherwise, the mobile device reattempts the cell search.

Therefore, if the measurement detected in the cell search is below the threshold, the cell search and the reception of the system information are to be repeated. To restrain the increase in power consumption at the mobile device due to this repetition, conventionally, a determination has been made after the cell search and before the reception of the system information as to whether or not to receive the system information, depending on the reception level or reception quality at the mobile device. Specifically, if the measurement detected in the cell search is below a threshold for determining whether or not to receive the system information (a system information reception threshold), the mobile device reattempts the cell search without receiving the system information. This can reduce the frequency of receiving the system information in the cell search and thereby restrain the increase in the power consumption at the mobile device. Further, it can reduce the frequency of receiving the system information by setting the system information reception threshold higher than a default minimum required quality level, considering the factors such as the variation among signal measurements detected in the cell search.

However, in the conventional cell search control method, a problem exists in which the predetermined system information reception threshold of the mobile device becomes inappropriate when the mobile device moves to an area having a different minimum required quality level or when the base station has changed the minimum required quality level through the system information. For example, if the minimum required quality level becomes higher than the system information reception threshold, the frequency of receiving the system information increases excessively, leading to the increase in the power consumption. If the minimum required quality level is set lower than the original value and the system information reception threshold is fixed, the mobile device cannot update the minimum required quality level until the mobile device detects a measurement equal to or above the system information reception threshold. Even if the minimum required quality level of the mobile device is updated, the mobile device cannot enter into the in-service area state until the mobile device detects a measurement equal to or above the system information reception threshold, and thereby repeating the cell search.

In the situation where signals are received from multiple base stations, the threshold settings from the base stations may be different. For example, the mobile communication system may set the thresholds such that entering into the in-service area state is more difficult with one base station (cell 1) while it is easier with another base station (cell 2). In such situation, consider a mobile device with the minimum required quality level for the cell 1. Since the system information reception threshold is typically set higher than the minimum required quality level, the mobile device is to repeat the cell search operation without receiving the system information containing the minimum required quality level for the cell 2. As a result, it becomes difficult for such mobile device to reflect settings from the mobile communication system.

DISCLOSURE OF THE INVENTION

The present invention has been made in view of the foregoing problems. The object of the present invention is to provide a cell search control method and a cell search control apparatus that can restrain the increase in power consumption at a mobile device and making an appropriate in-service area determination in a mobile communication system.

To achieve the above object, according to an aspect of the present invention, a cell search control method for a mobile device, the mobile device detecting a signal from a base station in a mobile communication system to perform a cell search, the method comprises: comparing a measurement of the signal from the base station with a first threshold to determine whether or not to receive a signal containing a second threshold from the base station; comparing the measurement of the signal from the base station with the second threshold to determine whether or not to enter into an in-service area state with the base station; and changing the first threshold based on the second threshold to perform the cell search again, wherein if it is determined not to receive the signal containing the second threshold from the base station, the first threshold may be changed to perform cell search again.

According to another aspect of the present invention, in the cell search control method, if it is determined not to receive the signal containing the second threshold from the base station, the first threshold may be changed by decreasing the first threshold by a predetermined value.

According to another aspect of the present invention, in the cell search control method, if it is determined not to receive the signal containing the second threshold from the base station, the first threshold may be changed to a threshold lower than and closest to the first threshold among first thresholds used in the past.

According to another aspect of the present invention, in the cell search control method, if it is determined not to receive the signal containing the second threshold from the base station, the first threshold may be changed to perform cell search again after a waiting time corresponding to a changed amount of the first threshold.

According to another aspect of the present invention, in the cell search control method, changing the first threshold based on the second threshold may include changing the first threshold according to the difference between the second threshold and the last-used second threshold.

According to another aspect of the present invention, a cell search control method for a mobile device, the mobile device detecting a signal from a base station in a mobile communication system to perform cell search, the method comprises: comparing a measurement of the signal from the base station with a first threshold to determine whether or not to receive a signal containing a second threshold from the base station; and comparing the measurement of the signal from the base station with the second threshold to determine whether or not to enter into an in-service area state with the base station, wherein if it is determined not to enter into the in-service area state with the base station, the base station may be excluded from the target for a predetermined time period or a predetermined number of times for repeating cell search.

According to another aspect of the present invention, in the cell search control method, if it is successively determined for a predetermined number of times not to enter into the in-service area state with the base station, the base station may be excluded from the target for a predetermined time period or a predetermined number of times for repeating cell search.

According to another aspect of the present invention, in the cell search control method, if it is determined not to enter into the in-service area state with the base station, the base station may be excluded from the target for a predetermined time period or a predetermined number of times corresponding to the result of comparing the measurement of the signal from the base station with the second threshold for repeating cell search.

According to another aspect of the present invention, a cell search control method for a mobile device, the mobile device detecting a signal from a base station in a mobile communication system to perform cell search, the method comprises: comparing a measurement of the signal from the base station with a first threshold to determine whether or not to receive a signal containing a second threshold from the base station; and comparing the measurement of the signal from the base station with the second threshold to determine whether or not to enter into an in-service area state with the base station, wherein if it is determined not to enter into the in-service area state with the base station, cell search may be performed again after a predetermined waiting time.

According to another aspect of the present invention, a mobile device for detecting a signal from a base station in a mobile communication system to perform cell search, the mobile device comprises: signal reception determination means for comparing a measurement of the signal from the base station with a first threshold to determine whether or not to receive a signal containing a second threshold from the base station; in-service area determination means for comparing the measurement of the signal from the base station with the second threshold to determine whether or not to enter into an in-service area state with the base station; and first threshold changing means for changing the first threshold based on the second threshold to perform the cell search again, wherein if the signal reception determination means determines not to receive the signal containing the second threshold from the base station, the first threshold may be changed to perform cell search again.

According to another aspect of the present invention, in the mobile device, if the signal reception determination means determines not to receive the signal containing the second threshold from the base station, the first threshold changing means may decrease the first threshold by a predetermined value.

According to another aspect of the present invention, in the mobile device, if the signal reception determination means determines not to receive the signal containing the second threshold from the base station, the first threshold changing means may change the first threshold to a threshold lower than and closest to the first threshold among first thresholds used in the past.

According to another aspect of the present invention, in the mobile device, if the signal reception determination means determines not to receive the signal containing the second threshold from the base station, cell search may be performed again after a waiting time corresponding to a changed amount of the first threshold.

According to another aspect of the present invention, in the mobile device, the first threshold changing means may change the first threshold depending on the difference between the second threshold and a last-used second threshold.

According to another aspect of the present invention, a mobile device for detecting a signal from a base station in a mobile communication system to perform cell search, the mobile device comprises: signal reception determination means for comparing a measurement of the signal from the base station with a first threshold to determine whether or not to receive a signal containing a second threshold from the base station; and in-service area determination means for comparing the measurement of the signal from the base station with the second threshold to determine whether or not to enter into an in-service area state with the base station, wherein if it is determined not to enter into the in-service area state with the base station, the base station may be excluded from the target for a predetermined time period or a predetermined number of times for repeating cell search.

According to another aspect of the present invention, in the mobile device, if the in-service area determination means successively determines for a predetermined number of times not to enter into the in-service area state with the base station, the base station may be excluded from the target for a predetermined time period or a predetermined number of times for repeating cell search.

According to another aspect of the present invention, in the mobile device, if the in-service area determination means determines not to enter into the in-service area state with the base station, the base station may be excluded from the target for a predetermined time period or a predetermined number of times corresponding to the result of comparing the measurement of the signal from the base station with the second threshold and the cell search may be repeated.

According to another aspect of the present invention, a mobile device for detecting a signal from a base station in a mobile communication system to perform a cell search, the mobile device comprises: signal reception determination means for comparing a measurement of the signal from the base station with a first threshold to determine whether or not to receive a signal containing a second threshold from the base station; and in-service area determination means for comparing the measurement of the signal from the base station with the second threshold to determine whether or not to enter into an in-service area state with the base station, wherein if the in-service area determination means determines not to enter into the in-service area state with the base station, cell search may be performed again after a predetermined waiting time.

BEST MODE FOR CARRYING OUT THE INVENTION

The present invention is applicable to a variety of mobile communication systems requiring cell search and in-service area determination. Examples of such mobile communication systems include, but not limited to, FDMA systems, TDMA systems, and CDMA systems. Embodiments of the present invention will be described in detail below with reference to the drawings.

Figure 1:
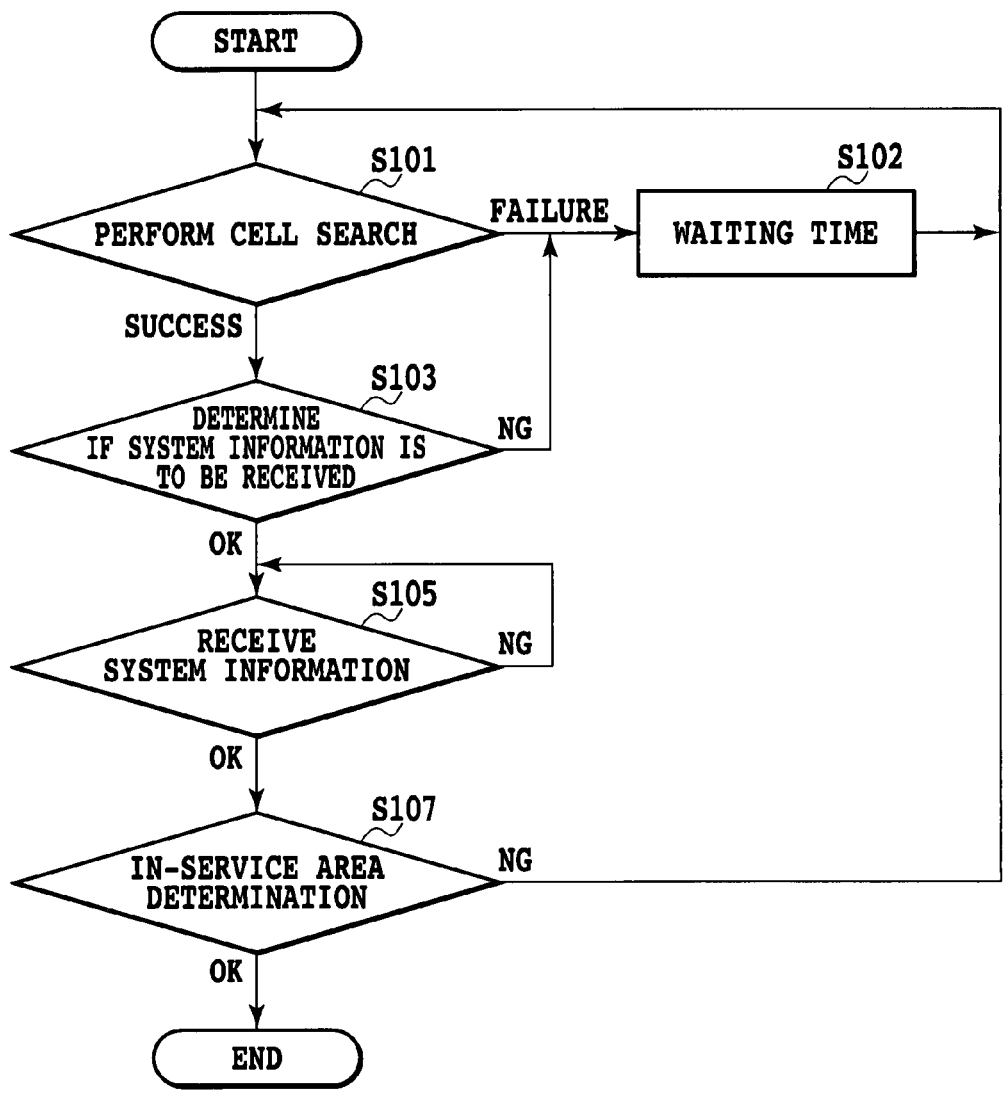
FIG. 1 is a flowchart showing an example of cell search control in a mobile device.

FIG. 1 shows an exemplary flowchart of the conventional cell search control. The cell search begins in the out-of-service state, such as when a mobile device is in an area where the signal strength is weak or when the mobile device is powered on. The mobile device performs the cell search to detect a certain synchronization channel such as a pilot signal and establish synchronization with a base station, such as symbol synchronization and frame synchronization (step S101). If the synchronization channel is not detected or the synchronization cannot be established, the cell search is reattempted after a predetermined waiting time (step S102). If the cell search succeeds and the synchronization is established, a determination is made as to whether or not to receive a system information transmitted on a channel such as a control channel (step S103). This is done by determining whether or not a measurement X of the synchronization channel detected in the cell search is equal to or above a system information reception threshold A. If the measurement X is below the threshold A, the cell search is reattempted after the predetermined waiting time (step S102). If the measurement X is equal to or above the threshold A, the system information is received (step S105). In that case, the mobile device obtains system information by timely receiving and decoding the system information transmitted on a certain channel such as a control channel. If the reception or decoding of the system information fails, the reception of the system information is reattempted (step S105). If the reception of the system information succeeds, an minimum required quality level B contained in the system information is read and compared with the measurement X of the synchronization channel detected in the cell search (step S107). If the measurement X is below the threshold B, the cell search is reattempted (step S107). If the measurement X is equal to or above the threshold B, the mobile device enters into the in-service area state.

Figure 2:
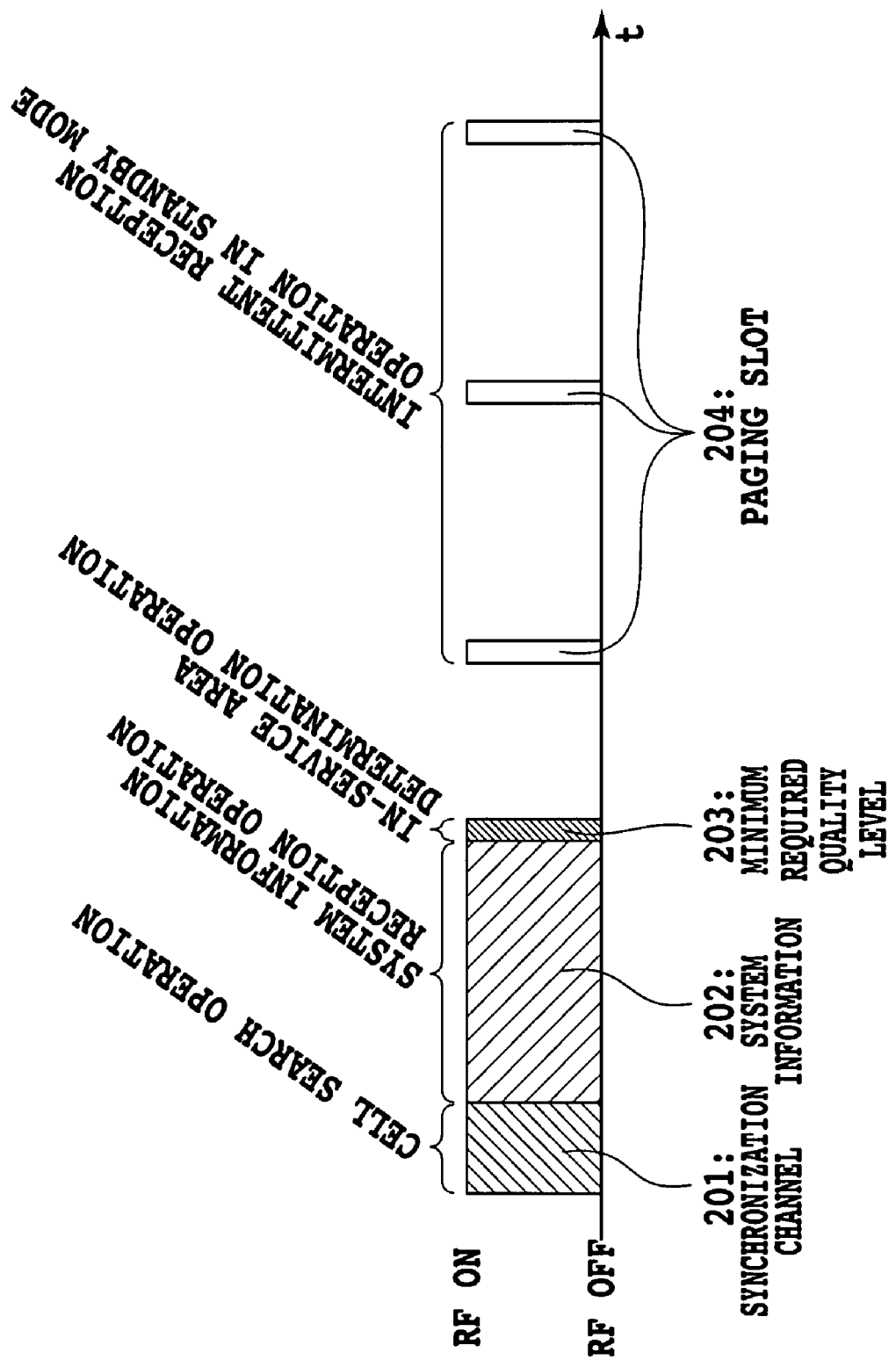
FIG. 2 is a time chart showing an example of the operational state when the mobile device succeeds in an in-service area determination.
Figure 3:
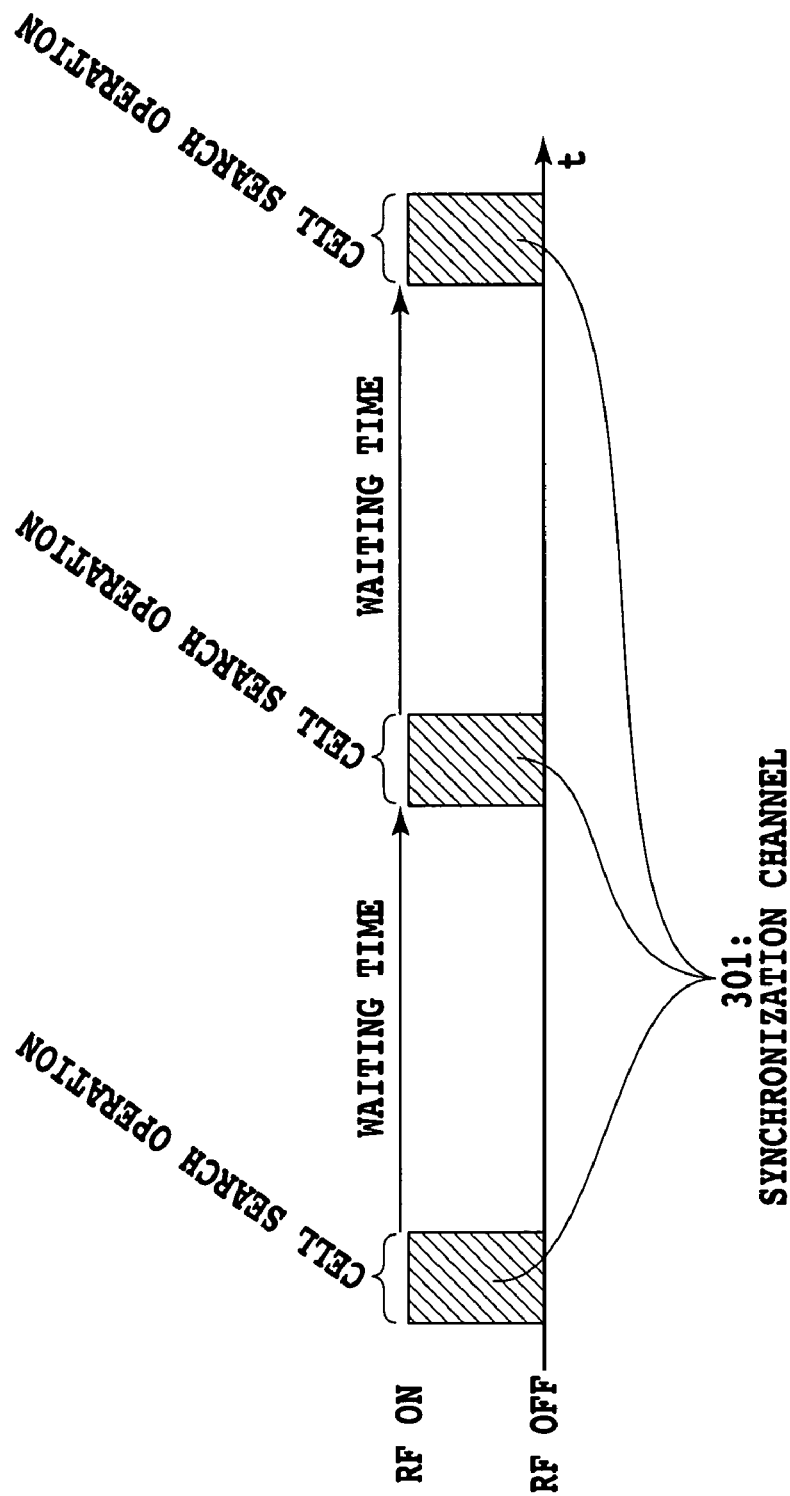
FIG. 3 is a time chart showing an example of the operational state when the mobile device fails in performing a cell search or in a system information reception determination.
Figure 4:
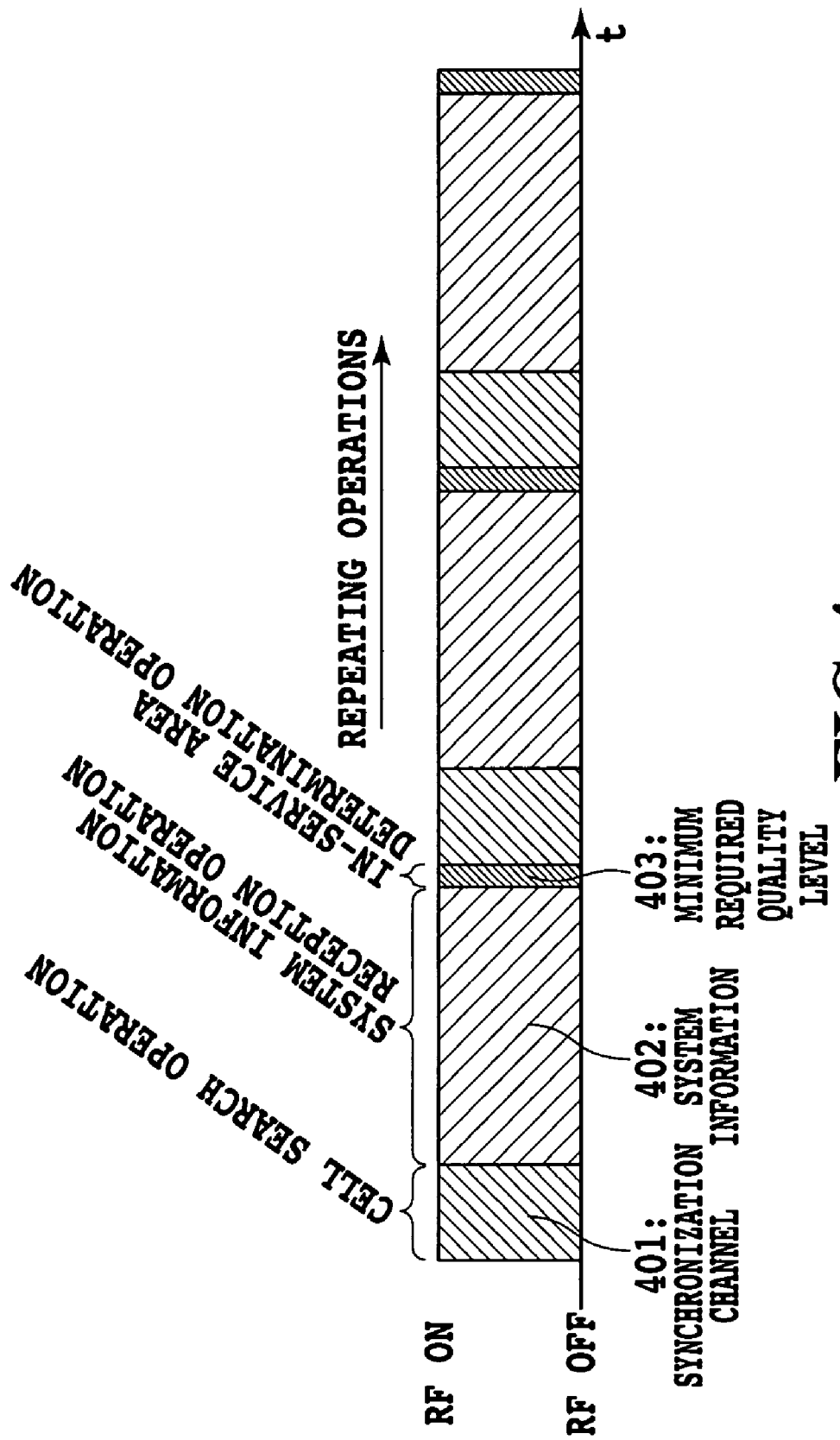
FIG. 4 is a time chart showing an example of the operational state when the mobile device succeeds in the system information reception determination but fails in the in-service area determination.

FIGS. 2 to 4 illustrate operational states of the mobile device during the control of FIG. 1. The figures show the reception on/off states at the mobile device, and FIG. 2 is when the in-service area determination succeeds (X>A and X>B), FIG. 3 is when the cell search or the system information reception determination fails (X<A) and FIG. 4 is when the system information reception determination succeeds but the in-service area determination fails (A<X and X<B).

As shown in FIG. 2, the mobile device performs the cell search operation for a synchronization channel 201. Once the cell search succeeds, the mobile device attempts to receive a system information 202. After the mobile device receives a minimum required quality level (B) 203 contained in the system information and succeeds in the in-service area determination, the mobile device enters into standby mode. In this standby mode, the mobile device typically operates to receive signals from the base station only in certain time slots for saving the battery consumption (intermittent reception operation).

In FIG. 3, the mobile device performs the cell search operation for a synchronization channel 301. Once the signal detection/synchronization establishment fails or the system information reception determination fails (X<A), the cell search is reattempted for the synchronization channel 301 after a predetermined waiting time. This waiting time may be set to an appropriate value considering the battery consumption and the network accessibility.

In FIG. 4, the mobile device performs the cell search operation for a synchronization channel 401. Once the signal detection/synchronization establishment succeeds and the system information reception determination succeeds (X>A), a system information 402 is received. After the reception of the system information succeeds, an minimum required quality level (B) 403 therein is set and the in-service area determination is performed. Once the in-service area determination fails (X<B), the mobile device returns to the cell search operation and repeats the above. Thus, if the cell search succeeds and the in-service area determination fails, the operational state of the mobile device remains in the on state and the battery is rapidly exhausted.

Figure 5:
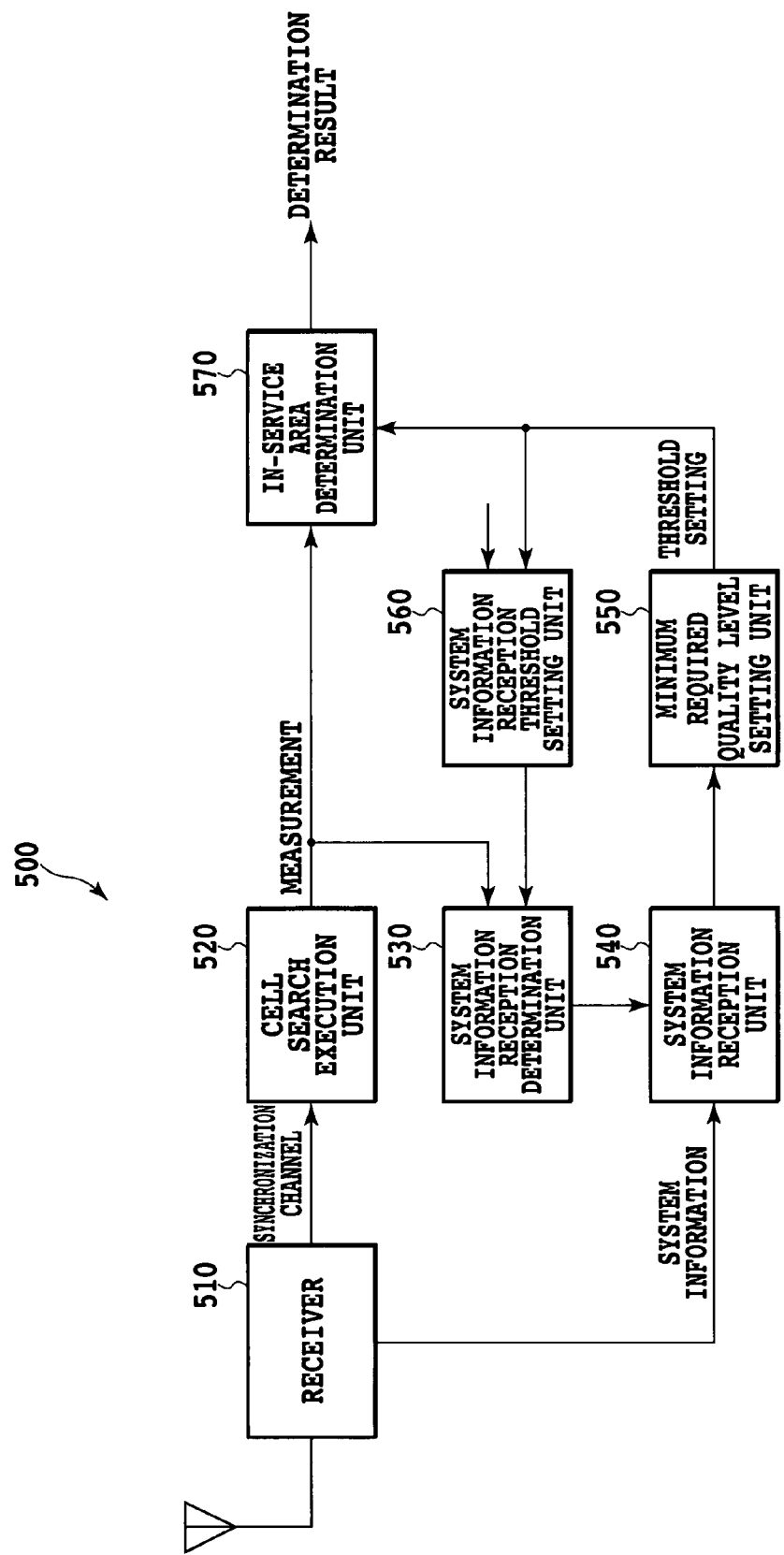
FIG. 5 is a functional block diagram showing an example of the configuration related to the cell search control in the mobile device according to the present invention.

FIG. 5 shows an exemplary configuration of the mobile device according to the present invention. FIG. 5 only illustrates functions required for describing the present invention and omits other functions of the mobile device. As shown, the mobile device 500 according to the present invention comprises a receiver 510 for receiving signals from a base station, and a cell search execution unit 520 for performing the cell search based on a received synchronization channel. The mobile device 500 further comprises a system information reception determination unit 530 for determining whether or not to receive a system information based on a measurement of the received signal, and a system information reception unit 540 for receiving the system information based on the system information reception determination. The mobile device 500 also comprises a minimum required quality level setting unit 550 for reading the minimum required quality level in the system information and setting the threshold, a system information reception threshold control unit 560 for controlling the system information reception threshold based on the minimum required quality level, and an in-service area determination unit 570 for performing the in-service area determination based on the minimum required quality level.

The receiver 510 monitors radio signals transmitted from the base station via an antenna and receives a certain synchronization channel such as a pilot signal. The cell search execution unit 520 detects the synchronization channel received via the receiver 510 and attempts to synchronize with the signal. This synchronization process typically involves symbol synchronization based on timing information contained in the synchronization channel, then establishing frame synchronization based on the symbol synchronization. In the process of this cell search, the cell search execution unit 520 can obtain a measurement X, such as the reception level (e.g., the RSSI) or the reception quality (e.g., the error rate), of the synchronization channel.

If the synchronization establishment in the cell search fails, the cell search execution unit 520 reattempts to synchronize with the synchronization channel after a predetermined waiting time (step S101). If the synchronization establishment succeeds, the system information reception determination unit 530 compares the measurement X obtained in the cell search with a threshold A set by the system information reception threshold control unit 560. If the measurement X is equal to or above the set threshold A, the system information reception determination unit 530 activates the system information reception unit 540.

The system information reception unit 540 receives the system information via the receiver 510 and decodes it. The system information contains a minimum required quality level B dictated by the mobile communication system through the base station. The minimum required quality level setting unit 550 reads the value of the threshold B contained in the system information and informs the system information reception threshold control unit 560 and the in-service area determination unit 570 of the value.

The system information reception threshold control unit 560 receives the minimum required quality level B from the minimum required quality level setting unit 550 and sets the threshold as the system information reception threshold A, for example by adding a predetermined offset to the threshold. For example, the mobile communication system may inform each mobile device of this offset as part of system information or control information. Alternatively, the mobile communication system may inform each mobile device of the system information reception threshold itself.

On the other hand, the in-service area determination unit 570 compares the minimum required quality level B from the minimum required quality level setting unit 550 with the measurement X of the synchronization channel detected in the cell search from the cell search execution unit 520 and outputs the result. If the measurement X of the synchronization channel is equal to or above the minimum required quality level B in the in-service area determination unit 570, the mobile device 500 enters into the in-service area state (FIG. 2). Otherwise, the mobile device 500 reattempts the cell search.

First Embodiment

Figure 6:
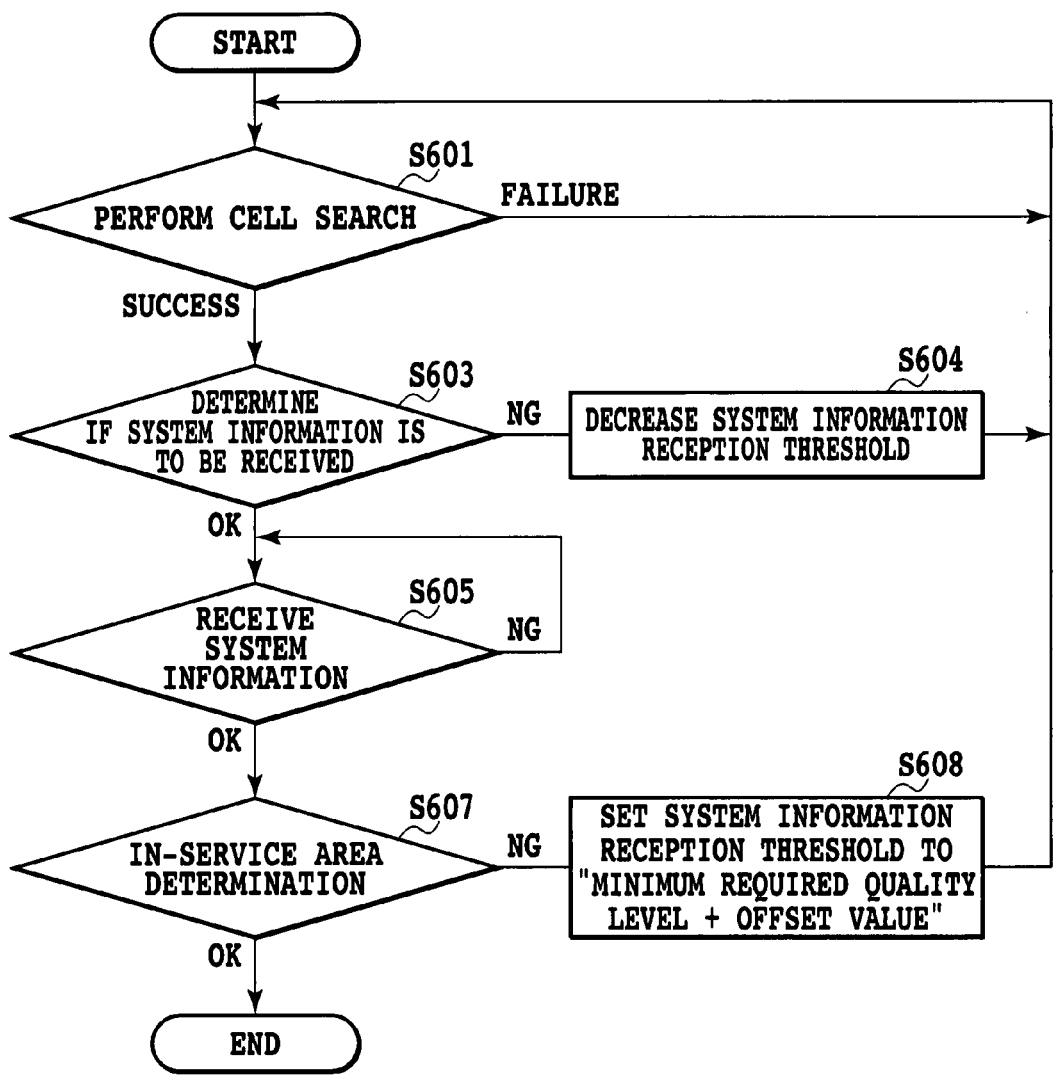
FIG. 6 is a flowchart showing an example of the cell search control in the mobile device according to a first embodiment of the present invention.

FIG. 6 shows an exemplary flowchart of the cell search control in the mobile device 500 according to a first embodiment of the present invention. By changing the value of the system information reception threshold A in each iteration, this embodiment allows the minimum required quality level B to be updated to an appropriate value while saving power consumption at the mobile device.

The mobile device 500 starts with the cell search operation from the out-of-service state. In step S601, the cell search execution unit 520 detects a synchronization channel received via the receiver 510 and performs the cell search operation for the signal. If the synchronization channel is not detected or the synchronization cannot be established, the cell search operation is again repeated. Here, as in the case of FIG. 1, the cell search may be repeated after a predetermined waiting time. If the cell search succeeds in step S601, a measurement X such as the reception level or the reception quality of the synchronization channel is obtained. The process then proceeds to the next step.

In step S603, the system information reception determination unit 530 compares the measurement X from the cell search execution unit 520 with the system information reception threshold A set by the system information reception threshold control unit 560. This threshold may be set to a certain default value or may be a value that has been set in the previous cell search. If the measurement from the cell search execution unit is below the threshold (X<A), the system information reception threshold control unit 560 decreases the value set for the threshold A by a predetermined value in step S604.

The process then returns to step S601 to perform the cell search operation again. This time, if the cell search succeeds, a new measurement X of a synchronization channel is obtained, which is then compared with the threshold A set as a new value decreasing by the predetermined value. Thus, the operations in steps S601 to S604 are repeated until the measurement X of the synchronization channel detected in the cell search exceeds the set system information reception threshold A (X>A).

The decreasing amount of the threshold set by the system information reception threshold control unit 560 may be fixed or variable in each iteration. The system information reception threshold control unit 560 may set a threshold lower than and closest to the current threshold among thresholds used in the past as the next system information reception threshold A. Furthermore, the value of the threshold set by the system information reception threshold control unit 560 may be changed or reset to a certain default value in response to the occurrence of other events, such as a user input and a timeout. Also, depending on the decreasing amount of the threshold, a predetermined waiting time may be set, so that the cell search may be repeated after the waiting time. For example, if the decreasing amount of the threshold is larger, the waiting time may be set longer to extend the interval of the cell search. The mobile communication system may transmit the information about these settings to each device as part of the system information or control information.

If the measurement X exceeds the system information reception threshold A, the system information reception unit 540 receives the system information via the receiver 510 and decodes it in step S605. If failed to receive or decode the system information, the reception of the system information is reattempted. If the system information cannot be received even after a predetermined number of reattempts, the process may return to the cell search of step S601. If the reception of the system information succeeds in step S605, the minimum required quality level setting unit 550 reads the minimum required quality level B contained in the system information and informs the system information reception threshold control unit 560 and the in-service area determination unit 570 of the threshold.

Then, in step S607, the in-service area determination unit 570 compares the measurement X from the cell search execution unit 520 with the minimum required quality level B from the minimum required quality level setting unit 550. If the measurement is below the threshold (X<B), in step S608, the system information reception threshold control unit 560 adds a predetermined offset value to the minimum required quality level B from the minimum required quality level setting unit 550 and sets it as the system information reception threshold A. The offset value may be fixed, or may be variable depending on the value of the minimum required quality level. The offset value may be a value obtained by subtracting the previous minimum required quality level from the current minimum required quality level (i.e., the difference). Furthermore, the offset value may be included in the system information so that the mobile communication system can set it.

The process then returns to step S601 to perform the cell search operation again. This time, if the cell search succeeds, a new measurement X of a synchronization channel is obtained, which is then compared with the system information reception threshold A as a new value by adding the offset to the minimum required quality level. In this manner, the system information threshold A is updated in each iteration based on the latest minimum required quality level B.

In step S607, if the measurement exceeds the minimum required quality level set by the minimum required quality level setting unit 550 (X>B), the in-service area determination unit 570 outputs the result and the mobile device 500 is set to the in-service area state.

Thus, even when the minimum required quality level B has been changed, the minimum required quality level B can be updated to an appropriate value by updating the system information reception threshold A to an appropriate value while saving power consumption at the mobile device in the cell search.

Second Embodiment

Figure 7:
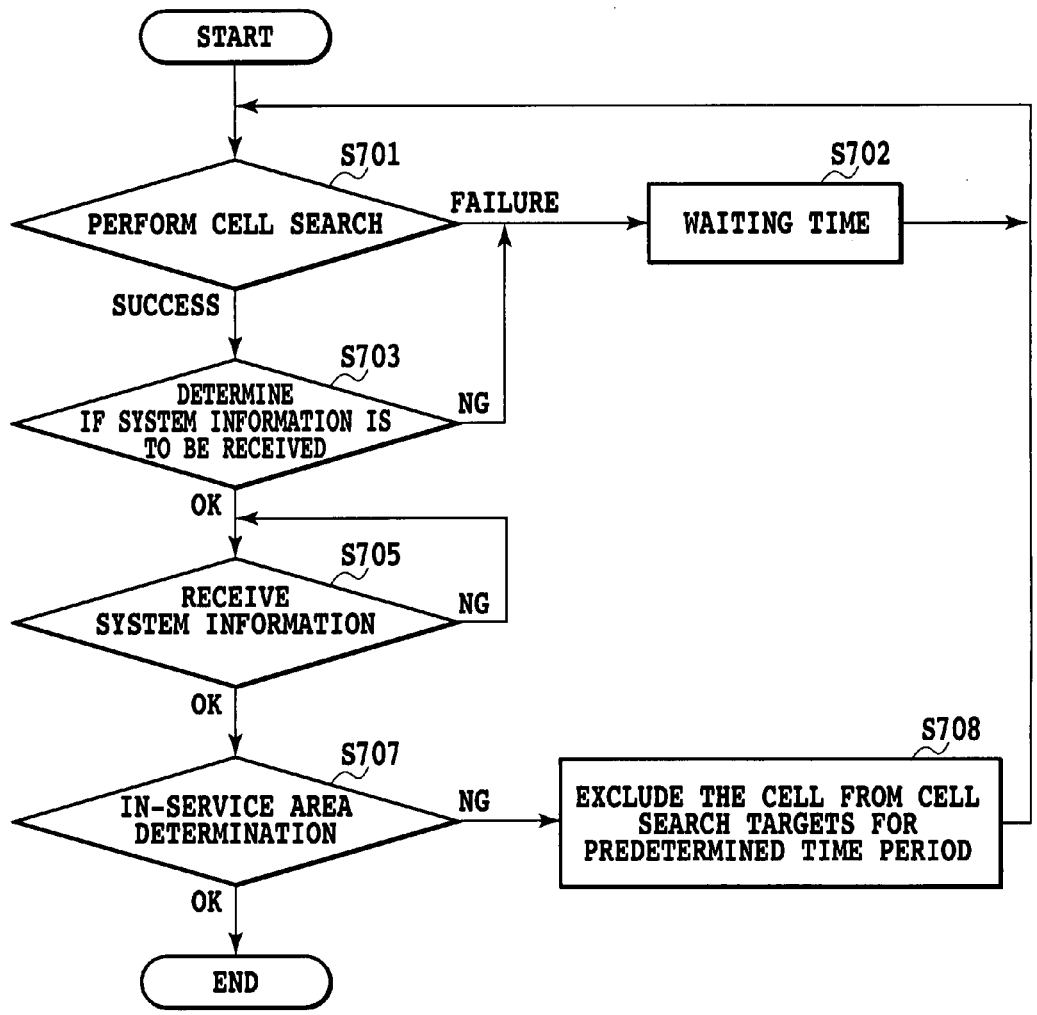
FIG. 7 is a flowchart showing an example of the cell search control in the mobile device according to a second embodiment of the present invention.

FIG. 7 shows an exemplary flowchart of the cell search control in the mobile device 500 according to a second embodiment of the present invention. In this embodiment, if the in-service area determination for a base station fails in the situation where signals are received from multiple base stations, the base station (cell) is excluded from the cell search target for a predetermined time period or a predetermined number of times, making an appropriate in-service area determination.

The mobile device 500 starts with the cell search operation in the out-of-service state. In step S701, the cell search execution unit 520 detects a synchronization channel received via the receiver 510 and performs the cell search operation for the signal. If the synchronization channel is not detected or the synchronization cannot be established, the cell search operation is repeated after a predetermined waiting time. If the cell search succeeds, a measurement X such as the reception level or the reception quality of the synchronization channel is obtained. The process then proceeds to the next step.

In step S703, the system information reception determination unit 530 compares the measurement X from the cell search execution unit 520 with the system information reception threshold A set by the system information reception threshold control unit 560. This threshold may be set to a certain default value or may be a value that has been set in the previous cell search. This threshold may also be set individually per base station. If the measurement from the cell search execution unit is below the threshold (X<A), the mobile device waits for a predetermined waiting time in step S702.

The process then returns to step S701 to perform the cell search operation again. This time, if the cell search succeeds, a new measurement X of a synchronization channel is obtained, which is then compared with the set system information reception threshold A. Thus, the operations in steps S701 to S704 are repeated until the measurement of the synchronization channel detected in the cell search exceeds the set system information reception threshold (X>A).

If the measurement X exceeds the system information reception threshold A, the system information reception unit 540 receives the system information via the receiver 510 and decodes it in step S705. If the reception of the system information or the decoding of the system information fails, the reception of the system information is reattempted. If the system information cannot be received even after a predetermined number of reattempts, the process may return to the cell search of step S701. If the reception of the system information succeeds in step S705, the minimum required quality level setting unit 550 reads the minimum required quality level B contained in the system information and informs the system information reception threshold control unit 560 and the in-service area determination unit 570 of the threshold.

Then, in step S707, the in-service area determination unit 570 compares the measurement X from the cell search execution unit 520 with the minimum required quality level B from the minimum required quality level setting unit 550. If the measurement is below the threshold (X<B), this base station is excluded from the cell search target for a predetermined time period or a predetermined number of times in step S708. The process then returns to step S701. This predetermined time period or a predetermined number of times may be fixed, or may be variable depending on the situation. This time period may be included in the system information so that the mobile communication system can set it.

The process then returns to step S701 to perform the cell search operation again for a signal from another base station. This time, if the cell search succeeds, a measurement X of a synchronization channel of that base station is obtained, which is then compared with the set system information reception threshold A. In this manner, the cell search operation is performed for signals of different base stations in each iteration.

In step S707, if the measurement exceeds the minimum required quality level set by the minimum required quality level setting unit 550 (X>B), the in-service area determination unit 570 outputs the result and the mobile device 500 is set to the in-service area state.

Thus, efficient cell searches are attained in the situation where signals are received from multiple base stations. Even when the base stations have different thresholds according to the settings of the mobile communication system, it becomes easier to reflect these thresholds as the settings of the mobile device.

In this embodiment, a base station can be identified based on the frequency or the scramble code assigned to the synchronization channel of the base station. For example, in FDMA/TDMA, if a different frequency is assigned for synchronization channel of each base station, the base station to be excluded from the cell search target can be identified based on the frequency. In CDMA, if a different frequency and/or scramble code is assigned for synchronization channel of each base station, the base station to be excluded from the cell search target can be identified based on the frequency and/or scramble code.

Third Embodiment

Figure 8:
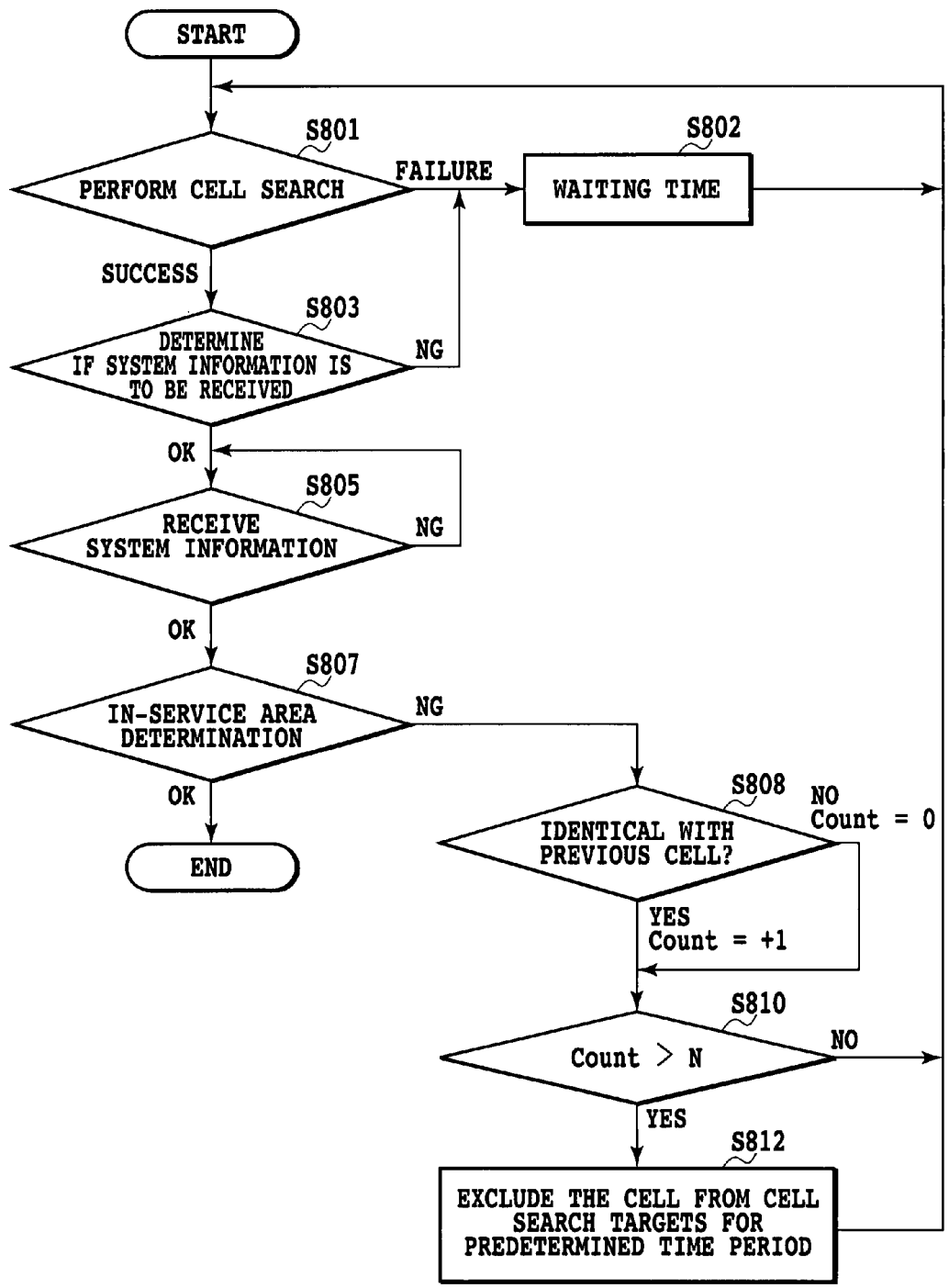
FIG. 8 is a flowchart showing an example of the cell search control in the mobile device according to a third embodiment of the present invention.

FIG. 8 shows an exemplary flowchart of the cell search control in the mobile device 500 according to a third embodiment of the present invention. In this embodiment, if the in-service area determination for a base station successively fails for a predetermined number of times N (e.g., three times) in the second embodiment, this base station (cell) is excluded from the cell search target for a predetermined time period or a predetermined number of times, making an appropriate in-service area determination. Steps S801 to S805 are similar to steps S701 to S705 in FIG. 7 and therefore the descriptions are omitted.

In step S807, the in-service area determination unit 570 compares the measurement X from the cell search execution unit 520 with the minimum required quality level B from the minimum required quality level setting unit 550. If the measurement is below the threshold (X<B), it is checked in step S808 whether this base station is same as the base station previously failed. If it is the same, the count is incremented by one. Otherwise, the count is reset to zero.

Then, in step S810, if the count does not exceed the predetermined number N, the process returns to step S801. If the count exceeds the predetermined number N, this base station is excluded from the cell search target for a predetermined time period or a predetermined number of times in step S812. The process then returns to step S801. The predetermined number of times N may be fixed, or may be variable depending on the situation. The predetermined number N may be included in the system information so that the mobile communication system can set it.

The process then returns to step S801 to perform the cell search operation again. This time, if the cell search succeeds, a measurement X of a synchronization channel of this base station is obtained, which is then compared with the set system information reception threshold A. In this manner, if the in-service area determination for one base station successively fails for a predetermined number of times, the cell search operation is performed for a signal of another base station.

In step S807, if the measurement exceeds the minimum required quality level set by the minimum required quality level setting unit 550 (X>B), the in-service area determination unit 570 outputs the result and the mobile device 500 is set to the in-service area state.

Thus, in the situation where signals are received from multiple base stations, efficient cell searches are attained by setting the predetermined number N to an appropriate value. In this embodiment, the base station can be identified in a manner similar to the second embodiment.

Fourth Embodiment

Figure 9:
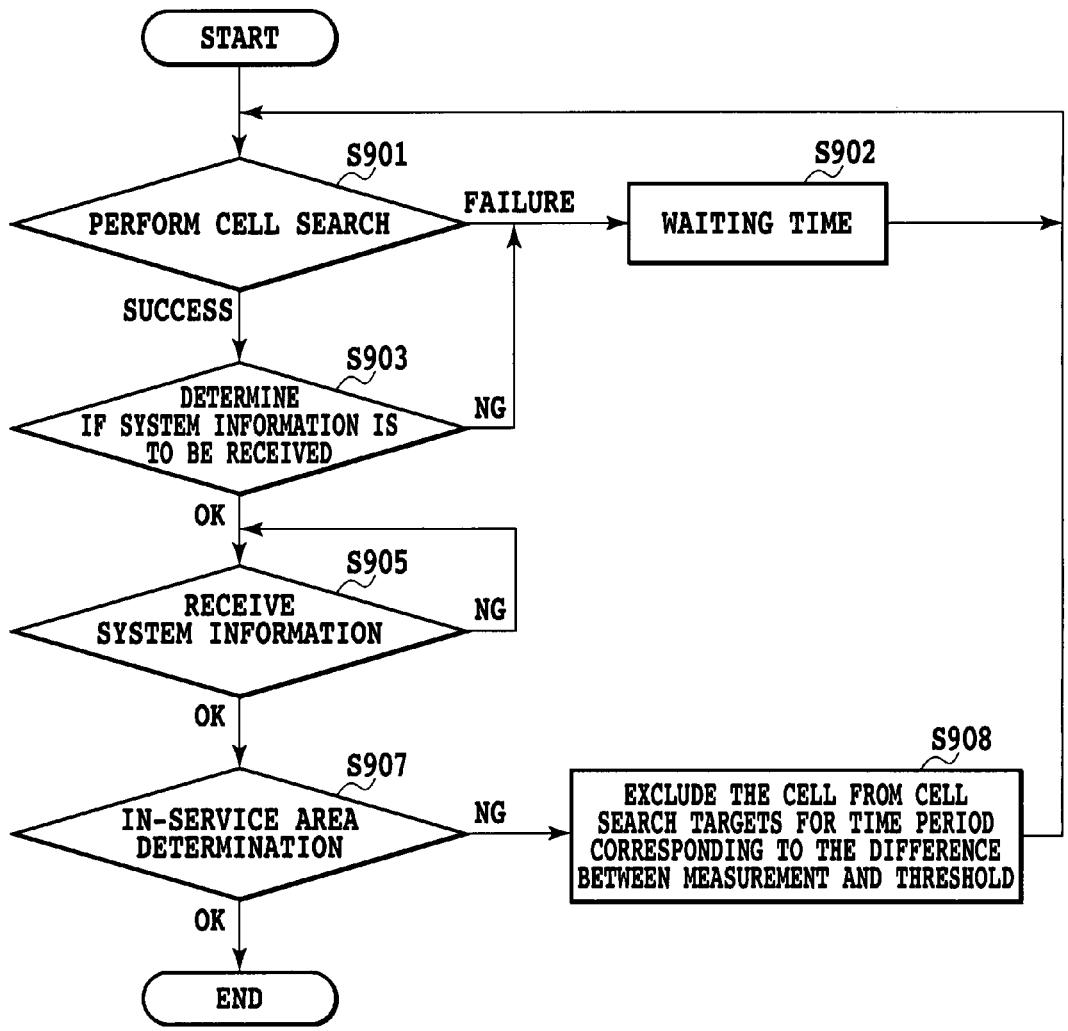
FIG. 9 is a flowchart showing an example of the cell search control in the mobile device according to a fourth embodiment of the present invention.

FIG. 9 shows an exemplary flowchart of the cell search control in the mobile device 500 according to a fourth embodiment of the present invention. In this embodiment, if the in-service area determination for a base station fails in the second embodiment, this base station (cell) is excluded from the cell search target for a time period or a number of times corresponding to the difference between the measurement X and the in-service area threshold B, making an appropriate in-service area determination. Steps S901 to S905 are similar to steps S701 to S705 in FIG. 7 and therefore the descriptions are omitted.

In step 907, the in-service area determination unit 570 compares the measurement X from the cell search execution unit 520 with the minimum required quality level B from the minimum required quality level setting unit 550. If the measurement is below the threshold (X<B), this base station is excluded from the cell search target for a time period or a number of times corresponding to the difference (B−X) between the measurement and the threshold in step S808. The process then returns to step S901. For example, this time period may be predetermined as the table below, or may be determined by a mathematical formula. The setting information about this time period or number of times may be included in the system information so that the mobile communication system can set it.

TABLE 1

| Difference between measurement and threshold (B − X) | Time period for excluding base station from cell search target |
|---|---|
| 0-3 dB | 0 seconds |
| −10 dB | 30 seconds |
| −20 dB | 60 seconds |
| 20 dB- | 120 seconds |

The process then returns to step S901 to perform the cell search operation again. This time, if the cell search succeeds, a measurement X of a synchronization channel of this base station is obtained, which is then compared with the set system information reception threshold A. In this manner, the cell search operation is performed in each repetition according to the difference between the measurement X and the in-service area threshold B.

In step S907, if the measurement exceeds the minimum required quality level set by the minimum required quality level setting unit 550 (X>B), the in-service area determination unit 570 outputs the result and the mobile device 500 is set to the in-service area state.

Thus, in the situation where signals are received from multiple base stations, efficient cell searches are attained based on the difference between the measurement X of the signal from the base station and the in-service area threshold B. In this embodiment, the base station can be identified in a manner similar to the second embodiment.

Fifth Embodiment

Figure 10:
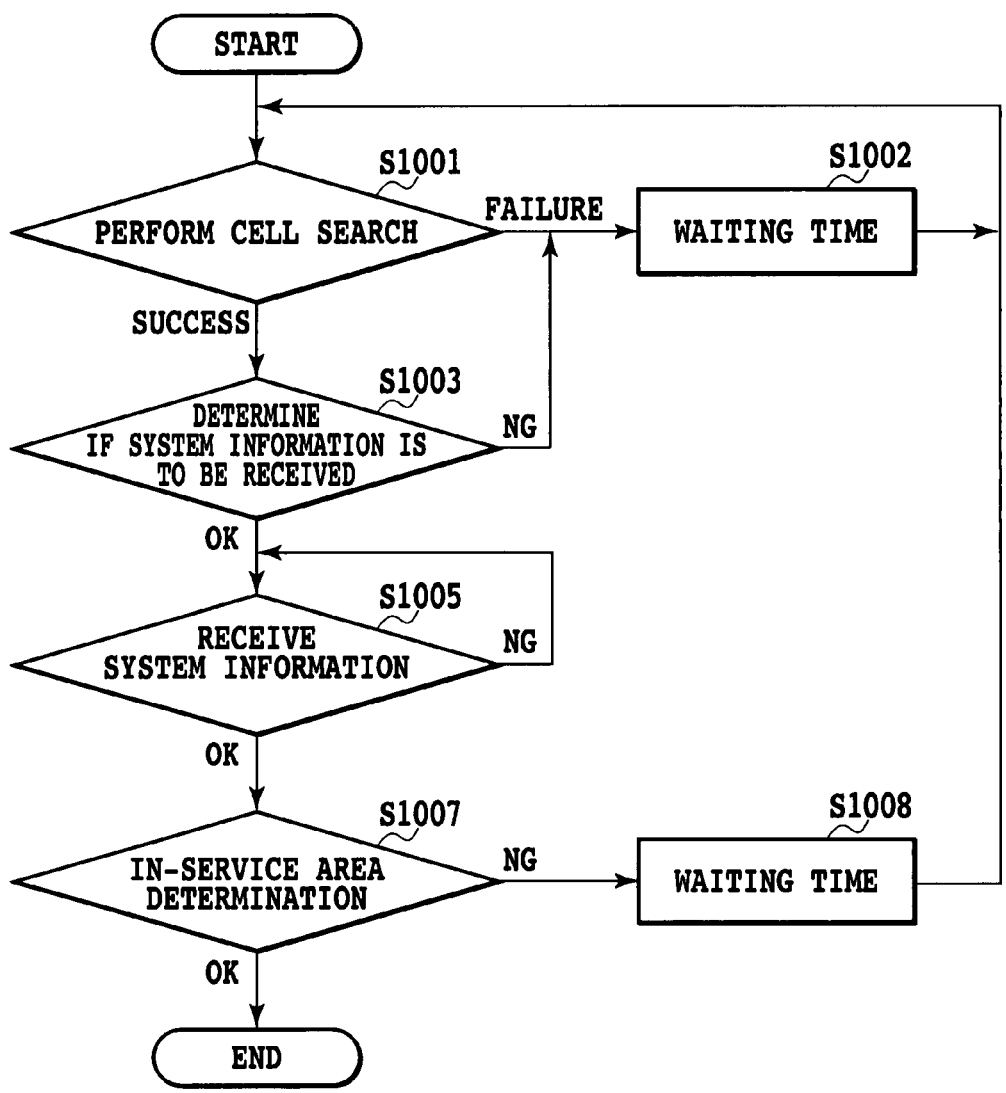
FIG. 10 is a flowchart showing an example of the cell search control in the mobile device according to a fifth embodiment of the present invention.

FIG. 10 shows an exemplary flowchart of the cell search control in the mobile device 500 according to a fifth embodiment of the present invention. In this embodiment, if the in-service area determination fails in the first embodiment, the cell search is performed again after a predetermined time period. This saves battery consumption at the mobile device. Steps S1001 to S1005 are similar to steps S101 to S105 in FIG. 1 and therefore the descriptions are omitted.

In step S1007, the in-service area determination unit 570 compares the measurement X from the cell search execution unit 520 with the minimum required quality level B from the minimum required quality level setting unit 550. If the measurement is below the threshold (X<B), the cell search is performed again after a predetermined time period in step S1008. This predetermined time period may be fixed, or may be variable depending on the situation. This time period may be included in the system information so that the mobile communication system can set it.

The process then returns to step S1001 to perform the cell search operation again. This time, if the cell search succeeds, a measurement X of a synchronization channel of this base station is obtained, which is then compared with the set system information reception threshold A. In this manner, the cell search is repeated after the predetermined time period, so that the cell search operation is performed intermittently.

In step S1007, if the measurement exceeds the minimum required quality level set by the minimum required quality level setting unit 550 (X>B), the in-service area determination unit 570 outputs the result and the mobile device 500 is set to the in-service area state.

Thus, even when the in-service area determination fails, power consumption at the mobile device in the cell search can be saved by waiting for a predetermined time period.

The several embodiments of the present invention have been described in detail. However, in view of many possible embodiments to which the principle of the present invention can be applied, the embodiments described herein are merely illustrative and not limiting on the scope of the present invention. For example, although the measurement X, used for the system information reception determination and the in-service area determination, has been described as a measurement of the synchronization channel obtained in the cell search, the in-service area determination may use a measurement of the system information when receiving the system information. Combinations of the embodiments may also be practiced as appropriate. The embodiments described herein may be modified in the configuration and details without departing from the spirit of the present invention. Furthermore, the illustrative components and processes may be modified, supplemented and/or reordered without departing from the spirit of the present invention.

INDUSTRIAL APPLICABILITY

The present invention is useful in situations where the minimum required quality level for each cell is changed or where different minimum required quality levels are used. For example, we may want to adjust the balance between the cell capacity and the cell size in the mobile communication system depending on the traffic of each cell in the system. Specifically, the minimum required quality level may be set higher to reduce the apparent cell size, thereby restraining the average transmission power on individual channels used in the cell and increasing the cell capacity (such as the number of simultaneous connecting users). Reversely, the minimum required quality level may be set lower to increase the cell size at the cost of the cell capacity. In a cellular network, the minimum required quality level can vary among providers in cases such as international roaming. The present invention can provide a mobile device that can flexibly operate even in such scenario.

The invention claimed is:

1. A cell search control method for a mobile device, the mobile device detecting a signal from a base station in a mobile communication system to perform cell search, the method comprising:
    comparing a measurement of a first signal from the base station with a first threshold to determine whether or not to receive a second signal containing a second threshold from the base station;
    if it is determined to receive the second signal, receiving the second signal containing a second threshold from the base station; and
    comparing the measurement of the first signal from the base station with the second threshold to determine whether or not to enter into an in-service area state with the base station, wherein
    if it is determined not to receive the second signal, the first threshold is changed to perform cell search again, and
    if it is determined not to enter an in-service area state with the base station, the first threshold is changed based on the second threshold to perform cell search again.

2. The cell search control method according to claim 1, wherein if it is determined not to receive the second signal, the first threshold is changed by decreasing the first threshold by a predetermined value.

3. The cell search control method according to claim 1, wherein if it is determined not to receive the second signal, the first threshold is changed to a threshold lower than and closest to the first threshold among first thresholds used in the past.

4. The cell search control method according to claim 1, wherein if it is determined not to receive the second signal, the first threshold is changed to perform cell search again after a waiting time corresponding to a changed amount of the first threshold.

5. The cell search control method according to any of claims 1 to 4, wherein changing the first threshold based on the second threshold includes changing the first threshold according to the difference between the second threshold and the last-used second threshold.

6. A cell search control method for a mobile device, the method comprising:
    performing a cell search to obtain a measurement of a signal from a base station;
    comparing the measurement of the signal from the base station with a first threshold; and
    comparing the measurement of the signal from the base station with a second threshold, wherein
    if the measurement of the signal from the base station does not exceed the first threshold, the cell search is repeated, and
    if the measurement of the signal from the base station does not exceed the second threshold, the base station is excluded from subsequent cell searches for a predetermined time period or a predetermined number of times for repeating cell search.

7. The cell search control method according to claim 6, wherein, the base station is excluded from subsequent cell searches for the predetermined time period or the predetermined number of times for repeating cell search only if the measurement of the signal from the base station does not exceed the second threshold for a predetermined number of times.

8. The cell search control method according to claim 6, wherein if the measurement of the signal from the base station does not exceed the second threshold, the base station is excluded from subsequent cell searches for a predetermined time period or a predetermined number of times corresponding to the result of comparing the measurement of the signal from the base with the second threshold for repeating cell search.

9. A cell search control method for a mobile device, the method comprising;
    performing a cell search on a target to obtain a measurement of a signal from a base station;
    comparing the measurement of the signal from the base station with a first threshold; and
    comparing the measurement of the signal from the base station with a second threshold, wherein
    if the measurement of the signal from the base station does not exceed the first threshold, the cell search is performed again after a first time period, and
    if the measurement of the signal from the base station does not exceed the second threshold, the cell search is performed again after a second time period.

10. A mobile device for detecting a first signal from a base station in a mobile communication system to perform cell search, the mobile device comprising:
- signal reception determination means for comparing a measurement of the first signal from the base station with a first threshold to determine whether or not to receive a second signal containing a second threshold from the base station;
- in-service area determination means for comparing the measurement of the first signal from the base station with the second threshold to determine whether or not to enter into an in-service area state with the base station; and
- first threshold changing means for changing the first threshold based on the second threshold to perform cell search again,
- wherein if the signal reception determination means determines not to receive the second signal containing the second threshold from the base station, the first threshold is changed to perform cell search again.

11. The mobile device according to claim 10, wherein if the signal reception determination means determines not to receive the second signal containing the second threshold from the base station, the first threshold changing means decreases the first threshold by a predetermined value.

12. The mobile device according to claim 10, wherein if the signal reception determination means determines not to receive the second signal containing the second threshold from the base station, the first threshold changing means changes the first threshold lower than the closest to the first threshold among first thresholds used in the past.

13. The mobile device according to claim 10, wherein if the signal reception determination means determines not to receive the second signal containing the second threshold from the base station, cell search is performed again after a waiting time corresponding to a changed amount of the first threshold.

14. The mobile device according to any of claims 10 to 13, wherein the first threshold changing means changes the first threshold depending on the difference between the second threshold and a last-used second threshold.

15. A mobile device comprising:
- cell search execution means for performing a cell search on a target to obtain a measurement of a signal from a base station in a mobile communication system;
- signal reception determination means for comparing a measurement of the signal from the base station with a first threshold to determine whether or not to receive a second signal containing a second threshold from the base station;
- receiver means for receiving the second signal from the base station; and
- in-service area determination means for comparing the measurement of the first signal from the base station with the second threshold to determine whether or not to enter into an in-service area state with the base station, wherein
- if the measurement of the signal from the base station does not exceed the first threshold, the cell search is repeated using the target, and
- if the measurement of the signal from the base station does not exceed the second threshold, the base station is excluded from subsequent cell searches for a predetermined time period or a predetermined number of times for repeating cell search.

16. The mobile device according to claim 15, wherein, the base station is excluded from subsequent cell searches for the predetermined time period or the predetermined number of times for repeating cell search only if the measurement of the signal from the base station does not exceed the second threshold for a predetermined number of times.

17. The mobile device according to claim 15, wherein if the measurement of the signal from the base station does not exceed the second threshold, the base station is excluded from subsequent cell searches for a predetermined time period or a predetermined number of times corresponding to the result of comparing the measurement of the first signal from the base station with the second threshold for repeating cell search.

18. A mobile device comprising:
- cell search execution means for performing a cell search on a target to obtain a measurement of a signal from a base station in a mobile communication system;
- signal reception determination means for comprising a measurement of the first signal from the base station with a first threshold to determine whether or not to receive a second signal containing a second threshold from the base station; and
- in-service area determination means for comparing the measurement of the first signal from the base station with the second threshold to determine whether or not to enter into an in-service area state with the base station, wherein
- if the measurement of the signal from the base station does not exceed the first threshold, the cell search is performed again after a first time period, and
- if the measurement of the signal from the base station does not exceed the second threshold, the cell search is performed again after a second time period.

* * * * *

UNITED STATES PATENT AND TRADEMARK OFFICE
CERTIFICATE OF CORRECTION

PATENT NO. : 7,907,947 B2
APPLICATION NO. : 11/664087
DATED : March 15, 2011
INVENTOR(S) : Takehiro Ida et al.

It is certified that error appears in the above-identified patent and that said Letters Patent is hereby corrected as shown below:

*Title page, item (86)
"PCT No.: PCT/JP2006/010169" should read --PCT No.: PCT/JP2006/310169--.

Claim 8, column 14, line 52, "from the base" should read --from the base station--.

Signed and Sealed this
Twelfth Day of July, 2011

David J. Kappos
*Director of the United States Patent and Trademark Office*